United States Patent

Gothier

[11] Patent Number: 5,957,351
[45] Date of Patent: Sep. 28, 1999

[54] CLAMPED-ON STORAGE RACK MEANS FOR FLAT BED TRAILERS

[75] Inventor: Richard J. Gothier, Mesa, Ariz.

[73] Assignee: Aero Industries, Inc.

[21] Appl. No.: 08/805,662

[22] Filed: Feb. 27, 1997

[51] Int. Cl.⁶ .................................................. B60R 9/00
[52] U.S. Cl. .......................... 224/401; 224/538; 224/558
[58] Field of Search ................................... 224/538, 401, 224/400, 558; 296/37.1, 37.6, 37.14; 248/228.1, 228.5

[56] References Cited

U.S. PATENT DOCUMENTS

| | | | |
|---|---|---|---|
| 4,418,853 | 12/1983 | Shaffer | 224/538 |
| 4,772,063 | 9/1988 | Amy | 224/538 |
| 4,890,970 | 1/1990 | Willits | 224/538 |

OTHER PUBLICATIONS

"At Tri–County Tarp, We Have a Lot in Store for You," Tri County Tarp bochure (date unknown).
Flatbed Accessories, Aero Industries, Inc., brochure, 1995.

*Primary Examiner*—Linda J. Sholl
*Attorney, Agent, or Firm*—Laubscher & Laubscher

[57] ABSTRACT

A storage rack assembly is adapted to be clamped between the two horizontally-spaced longitudinally-extending I-beams of a flat bed trailer, comprising a pair of tray-like end sections each including a pair of parallel horizontally-spaced side walls, a plurality of transverse members that are connected between the side walls to define a lower first storage chamber, and an upper rack device defining a second storage device connected between the upper edges of the side walls at a first end of the end section, the end sections being collinearly arranged with their other ends adjacent each other and connected together on opposite sides of a transverse divider wall. The storage rack assembly is arranged transversely beneath the trailer flat bed with the upper storage chambers adjacent the sides of the flat bed, respectively, upper clamping members being provided that straddle the upper flange surfaces of the I-beams and are clamped to lower clamping members that are secured to the upper edges of the side walls of the storage rack assembly and that extend beneath the I-beams. The dimensions of the upper and lower storage chambers are such as to receive the stake and plywood panel components, respectively, of a conventional side kit associated with the flat bed trailer. A transverse vertical door member is pivotally connected at each end of the storage rack assembly for opening and closing the associated upper and lower storage chambers.

12 Claims, 5 Drawing Sheets

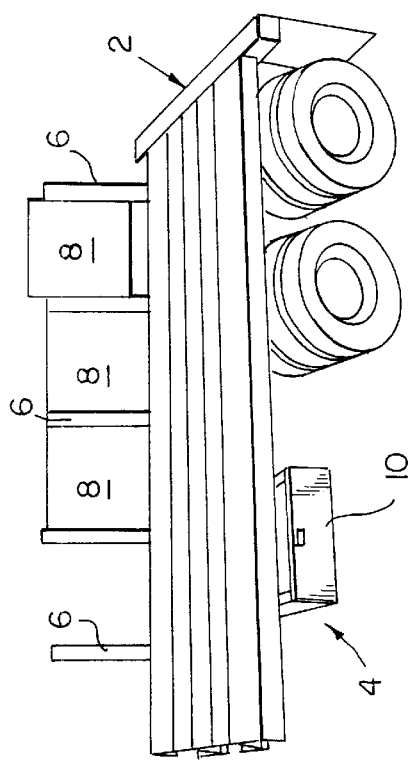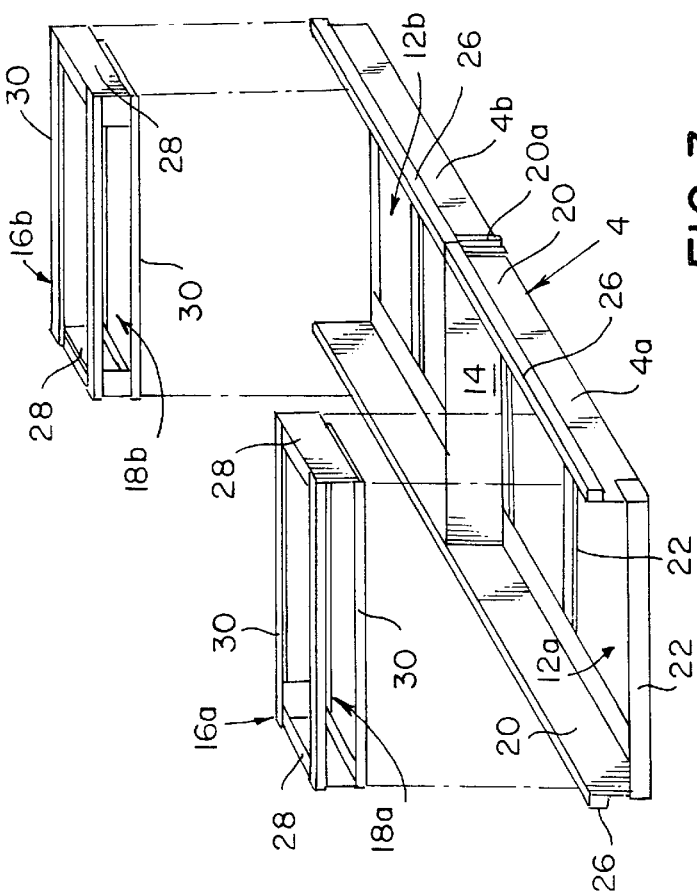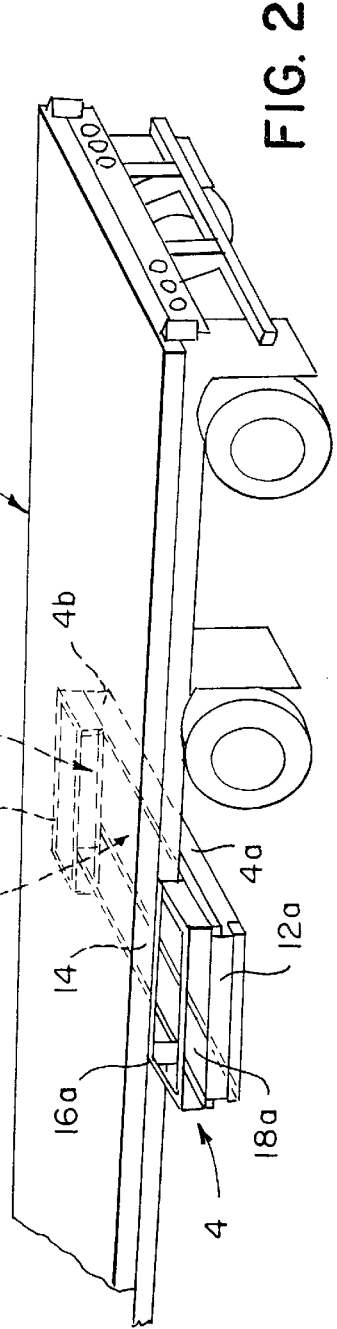

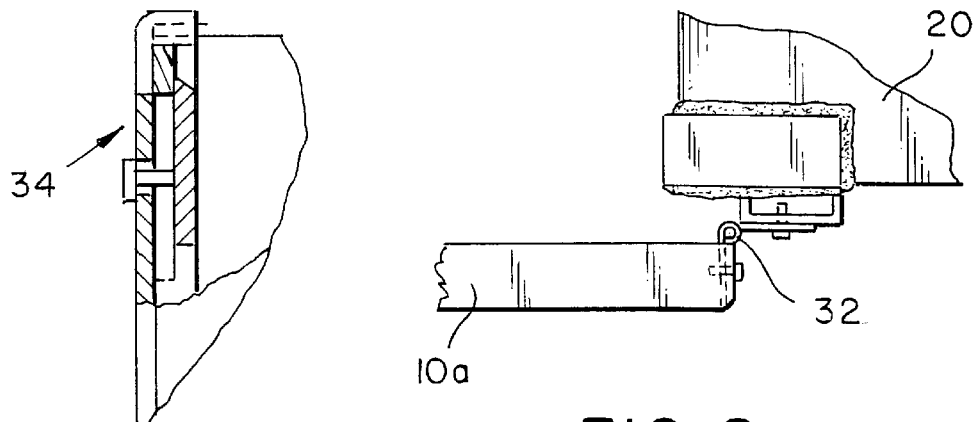
FIG. 7
FIG. 8
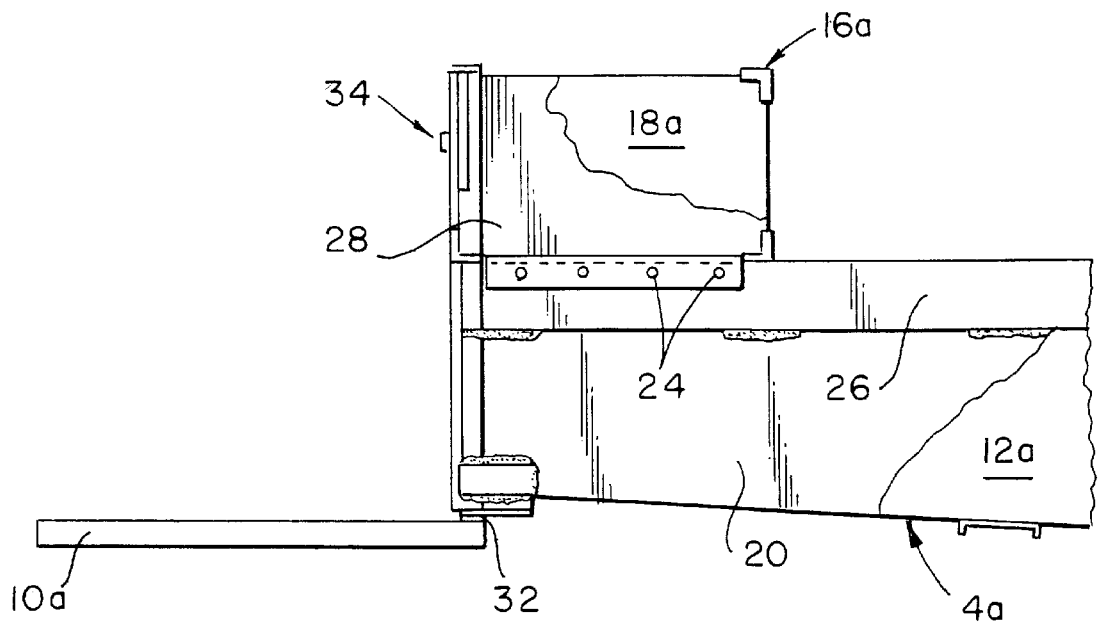
FIG. 6

CLAMPED-ON STORAGE RACK MEANS FOR FLAT BED TRAILERS

BACKGROUND OF THE INVENTION

1. Field of the Invention

This invention relates to a sectional storage rack assembly that is clamped transversely beneath the parallel horizontally-spaced longitudinally-extending I-beams of a flat bed trailer, said storage rack assembly including a pair of end sections each having a pair of parallel horizontally-spaced vertical side walls, and a plurality of transverse members connecting said side walls together to define a lower first storage chamber, and a pair of second storage racks connected between the upper edges of the side walls at the remote ends of the sections, which second storage racks define upper storage chambers. The sections are arranged end-to-end with their other ends adjacent each others which other ends are connected together on opposite sides of an intermediate transverse divider wall. The storage rack assembly is arranged transversely of the flat bed trailer with the upper storage compartments adjacent the sides of the flat bed, respectively, and upper clamping members are provided that straddle the upper surfaces of the flanges of the I-beams for connection with corresponding connecting members that extend under the I-beams and are fastened to the upper edges of the section side walls, respectively. Door closure members are pivotally connected with the remote ends of the end sections for closing both the upper and lower chambers. The dimensions of the upper and lower chambers are such as to receive the stakes and the plywood panels, respectively, of a conventional flat bed trailer side kit.

2. Brief Description of the Prior Art

Conventional flat bed trailers haul a variety of goods that require accessories to secure, cover or protect a load, as, for example, tarpaulins, side kits, cargo straps, and tie down chains. When these devices are not in use, it is conventional to store them in receptacles mounted above or below the load supporting surface of the flatbed. On example of an earlier version of an under-the-flatbed storage box is the STORMOR box produced by Aero Industries, Inc., the assignee of the present invention. Conventional side kits are removable modular flat bed side and end vertical components that convert the flat bed trailer into a short dry-freight van, and when not in use, the side kit is broken down into its components (stakes, rigid panels, roof bows, and tarpaulins), which components require storing on the flat bed, or in the bulkhead of the trailer.

Initially it was proposed to store the side kit components in a box, and owing to the voluminous size of the side kits and their relative large mass (on the order of 1000 pounds), the storage boxes were welded or bolted underneath the trailer. To save on weight and expense, it was then proposed to provide storage racks that were designed to hold only the plywood panels, the racks being one-piece shelves that were supported transversely beneath the trailer from the main beams and the cross beams of the trailer. These early racks were simple V-shaped shelves that were formed from steel angle iron by the dealer or the trucker. The middle of the rack was welded or bolted to the main beam, and the ends of the racks were supported by pairs of vertical members that were welded or bolted to the underside of the side rail or cross members.

In the 1980's, Aero Industries, Inc., produced a sectional unit in which, prior to attachment to the trailer, the two halves were bolted together for attachment below the plywood storage shelf. A major problem with such storage racks is the breakage that often occurs owing to the twisting and shaking forces of the trailer as it traveled down the highway. Especially on the outside of the rack, in the area where the vertical members were mounted to the side rail, the forces would be multiplied to such an extent as to break the rack apart. Furthermore, the prior units took too long to mount (i.e., on the order of 1 to 2 hours) and often required modification of the trailer, together with its clean up. One example of a competitor's storage device is the "Under Body Aluminum Side Kit Storage Rack" manufactured by Tri-County Tarp and Metal Products of Bradner, Ohio. Basically, the racks or the prior art were mounted in one of two ways—either by bolting or welding to the web of the I-beam, or by spanning the flanges of each main beam with a pair of members from which the rack was welded and hung, and supported at its extremes by the outermost vertical members. The Tri-County Tarp storage rack had a V-shaped design extending completely transversely beneath the trailer and was an earlier attempt to achieve mounting of the storage rack without welding.

The present invention was developed to provide an improved storage rack assembly which avoids the problems of breakage resulting from stresses during use, the mounting of the rack in any way on the cross members of the trailer, and the drilling of any holes into the trailer of the I-beams thereof, which is quickly installed, and which fits trailers of all sizes.

SUMMARY OF THE INVENTION

Accordingly a primary object of the present invention is to provide an improved storage rack for receiving the conventional side kit components of a flat bed trailer, including a sectional storage rack comprising, two end sections each having a pair of horizontally-spaced vertical side walls, transverse members connected between said side walls to define a first storage chamber, and means defining a second storage chamber connected at a first end of the section adjacent the top edges of the side walls, said end sections being collinearly arranged with the other ends of the sections being adjacent and connected together on opposite sides of a transverse vertical divider wall, and means for clamping said storage rack between the I-beams of a flat-bed trailer, which clamping means include a pair of parallel horizontally-spaced upper linear members straddling the upper surfaces of the lower flanges of the two main longitudinal I-beams of the trailer, pairs of lower linear clamping members that are connected with the side walls of the rack assembly and that extend beneath the I-beams, respectively, and bolt means connecting together said upper and lower clamping members.

According to another object of the invention, first resilient spacer or cushion devices, such as pads, are provided between the upper and lower linear clamping members, and second resilient devices are provided between the lower clamping members and the under surfaces of the I-beams, thereby to reduce the shocks and vibrations that would otherwise tend to vibrate and break up the storage rack assembly. Preferably the upper and lower clamping members are tubular members formed of aluminum or steel, the upper tubular members being adapted to be cut to length to straddle and be supported by the upper surfaces of the lower flanges of the two main longitudinal I-beams of the trailer, and the lower tubular members being secured to the upper edges of the side walls of the end sections of the storage rack.

According to a more specific object of the invention, a storage rack assembly is provided that is of inexpensive, light-weight sectional construction and which may be easily and quickly assembled by the dealer or by the trucker for clamping installation on a flat-bed trailer without requiring any drilling or structural modification of the trailer.

Another object of the invention is to provide a sectional storage rack assembly having two end sections that are bolted together on opposite sides of a transverse divider wall, each section having at its end adjacent the corresponding side of the trailer a pivotally mounted door that closes an upper chamber that is adapted to receive the slake components of a conventional flat-bed trailer side kit, and a lower chamber that is adapted to receive the plywood or synthetic plastic side panels of the side kit.

BRIEF DESCRIPTION OF THE DRAWINGS

Other objects and advantages of the invention will become apparent from a study of the following specification, when viewed in the light of the accompanying drawings, in which:

FIG. 1 is a perspective view of the rear end of a flat-bed trailer having certain side kit components mounted thereon;

FIG. 2 is a perspective view of the rear end of a flat bed trailer illustrating the location of the storage rack mounted transversely beneath the flat bed, with certain parts removed for purposes of illustration;

FIG. 3 is in exploded view illustrating the mounting of the upper storage racks at the remote ends of the two storage rack sections;

FIG. 6 is a detailed view of the door closure means at one end of the storage rack assembly;

FIG. 7 is a detailed view of the door latch means of FIG. 6;

FIG. 8 is a detailed view of the door hinge means of FIG. 6;

DETAILED DESCRIPTION

Referring first more particularly to FIGS. 1 and 2, the flat bed trailer 2 is provided with a storage rack 4 for storing the stakes 6 and side panels 8 of a conventional side kit.

Figure 5:
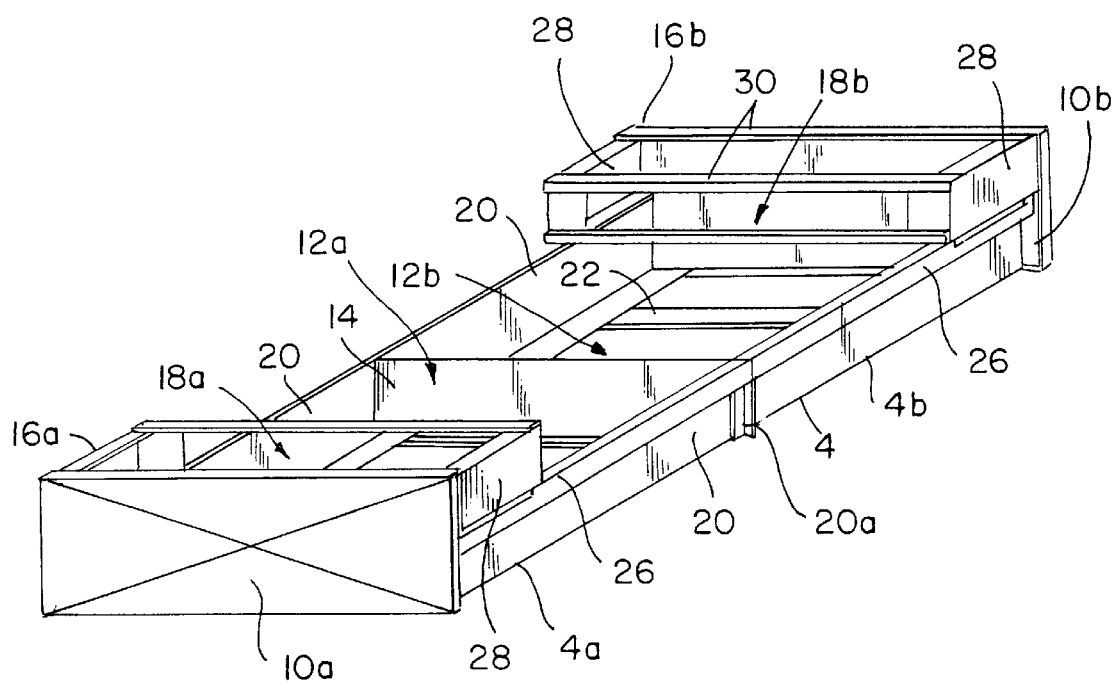
FIG. 5 is a perspective view of the completely assembled storage rack with the end door closure members mounted thereon.
Figure 10:
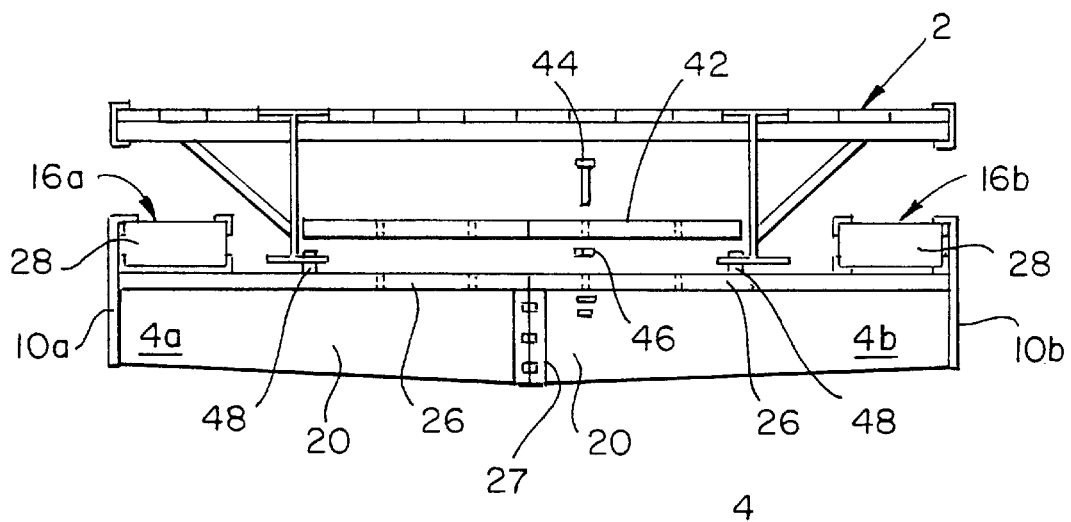
FIG. 10 illustrates the final clamping step of the mounting process.

As shown in FIG. 2, the storage rack assembly 4 extends transversely beneath the flat-bed trailer and includes a pair of generally tray-shaped end sections 4a and 4b that contain lower storage chambers 12a and 12b, respectively, which end sections are separated by a transverse vertical divider wall 14, and upper racks 16a and 16b mounted at the remote ends of the sections for defining upper storage chambers 18a and 18b adjacent the sides of the flat-bed. respectively. The remote ends of the chambers are closed by door closure members 10a and 10b, respectively, as shown in FIGS. 5 and 10, and as will be discussed in greater detail below. The upper chambers 18a and 18b are of such a size as to receive the side kit stakes 6, and the lower chambers 12a and 12b are of a size to receive the side kit side panels 8.

Figure 4:
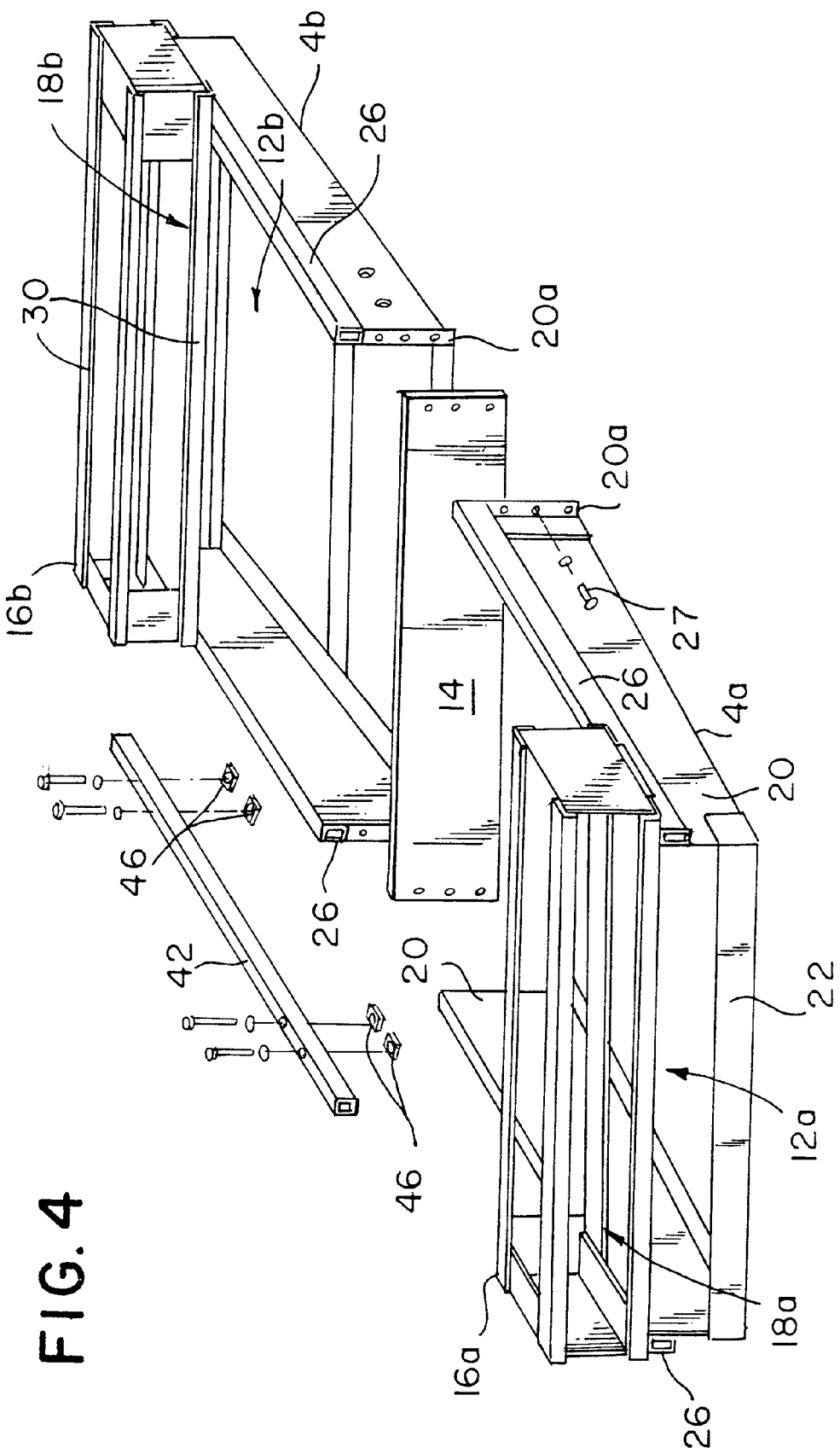
FIG. 4 is an exploded view of the sectional storage rack assembly of the present invention.

Referring now to FIGS. 3–5, each of the end sections 4a and 4b includes a pair of parallel horizontally-spaced vertical side walls 20 that are connected by transverse connecting members 22 to define the lower storage chambers 12a and 12b, respectively. At their remote first ends, the sections 4a and 4b are provided with the aforementioned upper storage racks 16a and 16b, respectively, that are secured (for example, by welding, bolt or rivet means 24, as shown in FIG. 6) to the lower clamping members 26 which, in turn, are secured to the upper edge portions of the side walls 20. At their adjacent second ends, the end section side walls have outwardly turned flange portions 20a that are bolted together on opposite sides of the vertical transverse side wall 14 by bolt means 27, as best shown in FIG. 4. Each of the upper storage racks 16a and 16b includes a pair of spaced vertical end walls 28 that are connected by the transverse connecting members 30, thereby to define the upper storage chambers 18a and 18b.

The door closure members 10a and 10b are pivotally connected at their lower edges with the remote ends of the end sections by piano-type hinges 32, as best shown in FIGS. 6 and 8. Latch means 34 (FIGS. 6 and 7) are provided adjacent the top edges of the doors for maintaining the same in a closed condition for closing both the upper and lower storage chambers 18a and 12a, respectively. If desired, the latch means 34 could be provided with conventional lock means.

Figure 9:
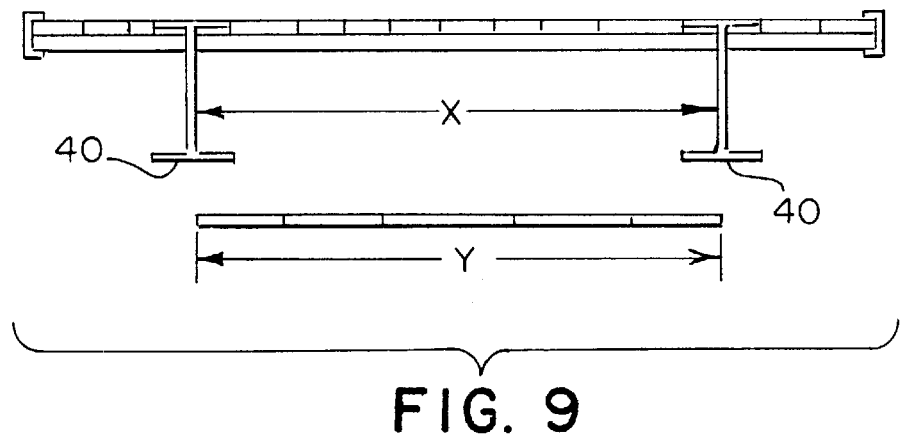
FIG. 9 is an exploded view of a preliminary measuring and cutting step of the method for clamping of the storage rack between the trailer I-beams.

Referring now to FIGS. 9 and 10, in order to mount the storage rack assembly beneath the two main horizontally-spaced longitudinally-extending I-beams 40 that extend under the trailer flat-bed, a pair of upper linear clamping members 42 are cut to a length "y" that is slightly less (i.e., about 1" less) than the distance "x" between the web portions of the I-beams, an equal amount being taken off of each end of the upper clamping members, whereby pre-drilled holes contained therein will be opposite pre-drill holes contained in the lower clamping members 26 that are welded to the side walls 20 of the sections 4a and 4b. After the upper clamping members 42 are arranged in straddling relation between the main I-beams in supported relation on the upper surfaces of the lower flanges of the I-beams, the assembled storage rack of FIG. 5 is raised (for example, by conventional jack means, not shown) toward the elevated position extending beneath the I-beams, as illustrated in FIG. 10, whereupon the upper and lower clamping members are connected by the bolt means 44 that extend through the aligned holes contained in the upper and lower clamping members. Thus, not only is the storage rack 4 tightly clamped in straddling relation between the I-beams, but also is the structural integrity of the storage rack assembly significantly increased by the bolting of the two upper clamping members 42 to the four lower clamping members 26 by the bolt means 44. Preferably, a plurality of first resilient cushion members 46 are bolted between the upper and lower clamping members, and a plurality of second cushion members 48 are compressed between the lower clamping members 26 and the lower surfaces of the two I-beams, respectively. These cushion members are formed of rubber, or a suitable resilient synthetic plastic material. The components of the storage rack assembly are formed from aluminum, light weight steel, or the like.

The sectional storage rack means is easily assembled and installed by the dealer or by the trucker in a relatively short period of time (on the order of 30 minutes), and offers the advantage that one size of storage rack fits all sizes of flat-bed trailers. Owing to the clamping mounting of the storage rack means, no drilling or structural weakening of the trailer is produced, and the storage rack assembly is structurally strengthened by the clamping members and is supported in a cushioned manner to resist the stresses that are normally imparted through use on the road. The bottoms of the lower storage chambers 12a and 12b on opposite sides of the transverse wall 14 are downwardly inclined in the direction of the transverse wall, respectively, whereby as shown in FIG. 10, each of the stacks $S_1$ and $S_2$ of the rigid panels 8 is supported in an inclined manner.

While the preferred forms and embodiments of the invention have been illustrated and described, it will be apparent to those skilled in the art that changes may be made without deviating from the inventive concepts set forth above.

What is claimed is:

1. A storage rack assembly adapted for mounting between a pair of parallel horizontally spaced longitudinal I-beams of a flat bed trailer having removable side kit components including vertical stakes and rigid panels, comprising:
   (a) a rectangular sectional storage rack, including:
      (1) a pair of generally tray-shaped end sections (4a, 4b) each having:
         (a) a pair of parallel vertical horizontally-spaced side walls (20) having upper and lower horizontal edges;
         (b) at least one transverse spacer member (22) connected between said side walls, thereby to define a lower storage chamber (12a, 12b); and
         (c) means defining an upper storage chamber (18a, 18b) connected at a first end of said end section between the upper edge portions of said vertical side walls, said end sections having second ends and being arranged collinearly with said second ends adjacent each other, said upper and lower storage compartments being so dimensioned as to receive said stakes and said panels, respectively;
      (2) vertical transverse divider wall means (14) extending between said side walls at said second ends of said end sections; and
      (3) means (20a) connecting together said end sections and said divider wall means; and
   (b) clamping means (42) for connecting said storage rack between the I-beams with the longitudinal axis of said storage rack extending transversely to the longitudinal axes of the I-beams with said upper storage means adjacent the sides of the flat bed trailer, respectively, said clamping means including:
      (1) bridging means adapted to extend between, and to be supported by, the upper surfaces of the lower flanges of the I-beams; and
      (2) connecting means connecting said bridging means with the upper edges of said storage rack side walls.

2. A storage rack assembly as defined in claim 1, wherein said bridging means comprises:
   a pair of parallel horizontally spaced upper linear clamping members adapted to extend between, and to be supported by the upper surfaces of the lower flanges of, said I-beams, respectively;
   and further wherein said connecting means includes:
      (a) two collinear pairs of parallel lower linear clamping members connected with the upper edges of said side walls of said storage rack end sections, respectively, said upper linear members being arranged directly above said lower linear members, respectively; and
      (b) bolt means connecting said upper clamping members with said lower clamping members.

3. A storage rack assembly as defined in claim 2, wherein said upper and lower clamping members are hollow tubes.

4. A storage rack assembly as defined in claim 2, and further, including a vertical door closure member pivotally connected with said first end of each of said end sections for displacement between closed and open positions, thereby to close simultaneously, and to open simultaneously, said upper and lower storage chambers, respectively.

5. A storage rack assembly as defined in claim 4, and further including door latch means for maintaining the door closure member in said closed position.

6. A storage rack assembly as defined in claim 2, and further including first resilient spacer means arranged for compression between said upper and said lower clamping members.

7. A storage rack assembly as defined in claim 6, wherein said lower tubes extend generally the length of the associated section side wall, and further including second resilient spacer means arranged for compression between said lower tubes and the lower surfaces of the associated I-beams, respectively.

8. A storage rack assembly as defined in claim 1, wherein said means defining said upper storage chamber includes an upper rack having a pair of side walls parallel with and adjacent said end section side walls, respectively, and a plurality of transverse members connecting said upper rack side walls.

9. A storage rack assembly as defined in claim 1, wherein the bottoms of said lower storage chambers are inclined downwardly and converge toward said transverse divider wall, thereby to support stacks of the rigid panels each in an inclined orientation, respectively.

10. A storage rack assembly for mounting between a pair of longitudinal I-beams of a flatbed trailer having removable side kit components including vertical stakes and rigid panels, comprising:
   (a) a rectangular sectional storage rack including:
      (1) a pair of generally tray-shaped end sections each having:
         (a) a pair of parallel vertical horizontally-spaced side walls having horizontal upper and lower edges; and
         (b) at least one transverse spacer member connected between said side walls, thereby to define a lower storage chamber;
         (c) said end sections being collinearly nearly arranged and having second ends adjacent each other, said lower storage compartments being so dimensioned as to receive said panels;
      (2) vertical transverse divider wall means extending between said side walls at said end section second ends; and
      (3) means connecting together said end sections and said divider wall means;
   (b) clamping means for connecting said storage rack with said I-beams with the longitudinal axis of said storage rack assembly extending transversely to the longitudinal axis of said I-beams, said clamping means including:
      (1) at least one upper clamping member adapted to extend between, and to be supported by the upper surface of, the lower flanges of the I-beams;
      (2) at least one lower clamping means extending below said I-beams;
      (3) means connecting said lower clamping means with the side walls of both of said sections; and
      (4) bolt means connecting said lower clamping means with said upper clamping member; and
   (c) a pair of stake storage racks connected with the upper edges of the side walls at the remote ends of said sections, respectively, said stake storage racks having upper storage chambers for receiving the side kit stakes.

11. A storage rack assembly as defined in claim 10, and further including:

(d) a pair of door closure members pivotally connected at the remote ends of said end sections, respectively, each door member being operable to close the associated upper and lower storage chambers.

12. A storage rack assembly for use with a flatbed vehicle having a pair of horizontal longitudinally-extending laterally spaced I-beams each having upper and lower horizontal flange portions connected by a vertical connecting portion, the flatbed vehicle also having a plurality of removable components, comprising:

(a) a rectangular storage rack, including:
  (1) a pair of generally tray-shaped collinearly-arranged end sections (4*a*, 4*b*) each having a pair of vertical side walls (20) connected by at least one transverse spacer member (22) to define a storage chamber (12*a*, 12*b*) for receiving at least some of the components; and
  (2) means connecting said end sections together to define a rigid storage rack (4); and (b) clamping means (42) for connecting said storage rack below the I-beams with the longitudinal axis of said storage rack extending transversely relative to the longitudinal axes of the I-beams, and with said end sections being arranged adjacent the sides of the flat bed vehicle, respectively, said clamping means including:
  (1) bridging means (42) adapted to extend between the I-beams and to be supported by the upper surfaces of the lower flange portions thereof; and
  (2) connecting means (44) connecting said storage rack with said bridging means.

\* \* \* \* \*